United States Patent [19]
Klein et al.

[11] Patent Number: 6,077,489
[45] Date of Patent: Jun. 20, 2000

[54] OXIDATION CATALYST FOR INTERNAL COMBUSTION ENGINES

[75] Inventors: Harald Klein, Bessenbach; Hans Van Den Tillaart, Freigericht; Egbert Lox, Hanau; Thomas Kreuzer, Karben; Stephan Eckhoff, Wunstorf, all of Germany

[73] Assignee: Degussa-Hüls Aktiengesellschaft, Frankfurt, Germany

[21] Appl. No.: 09/212,474

[22] Filed: Dec. 16, 1998

[30] Foreign Application Priority Data

Dec. 17, 1997 [DE] Germany .................. 197 56 144

[51] Int. Cl.⁷ .................. B01D 53/94; B01J 21/12; B01J 23/14; B01J 23/42
[52] U.S. Cl. .................. 423/213.5; 502/334; 502/349; 502/500
[58] Field of Search .................. 423/213.5; 502/329, 502/349, 334, 500

[56] References Cited

U.S. PATENT DOCUMENTS

| | | | |
|---|---|---|---|
| 3,425,792 | 2/1969 | Stephens | 502/334 |
| 3,893,949 | 7/1975 | Sakai et al. | 252/454 |
| 5,049,364 | 9/1991 | Yoshimoto et al. | 423/239 |
| 5,128,305 | 7/1992 | Yoshimoto et al. | 502/243 |

FOREIGN PATENT DOCUMENTS

| | | |
|---|---|---|
| 0211233A1 | 2/1987 | European Pat. Off. . |
| 0362960A2 | 4/1990 | European Pat. Off. . |

OTHER PUBLICATIONS

Database WPI, Section Ch, Week 197522, Derwent Publication Ltd., London, GB; XP002125142 & JP 49 093267A Sep. 5 1974.

Database WPI, Section Ch, Week 199321, Derwent Publication Ltd., London, GB; XP002125143 & JP 05 103985A Apr. 27, 1993.

Japan Patent Application Disclosure No. 07–024327, Jan. 27, 1995.

*Primary Examiner*—Steven P. Griffin
*Assistant Examiner*—Timothy C Vanoy
*Attorney, Agent, or Firm*—Smith Gambrell & Russell, LLP

[57] ABSTRACT

An oxidation catalyst for internal combustion engines which contains platinum on a finely divided support material and containing lead as a promoter. The catalytic activity of the oxidation catalyst can be increased greatly by promoting the catalyst with lead at a molar ratio of lead to platinum of 2:1. The light-off temperatures of the promoted catalyst are well below the corresponding temperatures for a conventional, lead-free catalyst.

8 Claims, 2 Drawing Sheets

OXIDATION CATALYST FOR INTERNAL COMBUSTION ENGINES

INTRODUCTION AND BACKGROUND

The present invention relates to an oxidation catalyst for internal combustion engines which contains platinum as a catalytically active component on a finely divided support material.

As is widely known, catalysts which contain mainly noble metals from the platinum group of the Periodic System of Elements as catalytically active components are used for the treatment of exhaust gases from internal combustion engines.

Among the broad range of available catalysts for this purpose, the oxidation catalysts, reduction catalysts and so-called three-way converters can be differentiated.

The exhaust gas from internal combustion engines contains essentially three harmful substances; namely, carbon monoxide, unburnt hydrocarbons and nitrogen oxides. The term "nitrogen oxides" refers to a mixture of different oxidation states of nitrogen. About 90 vol. % of this mixture consists of nitrogen monoxide. The remainder mainly consists of nitrogen dioxide. This is conventionally indicated by the notation "NOX".

Three-way converters are able simultaneously to convert all three harmful substances to the harmless compounds; i.e., carbon dioxide, water and nitrogen. The prerequisite for this is that the internal combustion engine is operated with an air/fuel ratio close to the stoichiometric air/fuel ratio. The stoichiometric air/fuel ratio for conventional engine fuels has the value 14.6 kg of air per kg of fuel. In the event of simultaneous conversion of the three harmful substances, carbon monoxide and hydrocarbons act as reducing agents for the nitrogen oxides. Three-way converters contain rhodium as an essential component, in addition to platinum and/or palladium. The rhodium contributes to the ability of the catalyst to reduce nitrogen oxides.

Oxidation catalysts contain substantially platinum and/or palladium as catalytically active components. They can efficiently oxidize the unburnt exhaust gas components in oxygen-rich exhaust gas and thus convert them into harmless substances.

The catalytic activity of noble metal catalysts is extremely dependent on temperature. They are only slightly active at ambient temperature and therefore can only incompletely convert the harmful substances during the cold-start phase of internal combustion engines. The activity of the catalysts increases with increasing temperature. The light-off temperature of a catalyst is defined as the exhaust gas temperature at which the catalyst converts exactly 50% of a harmful substance into harmless gases. The light-off temperature of a catalyst may have a different value for each harmful substance. On achieving their operating temperature, which may be between 300 and 500° C., depending on the type of catalyst, known catalysts convert harmful substances with an efficiency of more than 70%.

Modern diesel and petrol engines operate with a large excess of air, with air/fuel ratios of more than 18, in order to reduce the fuel requirement. In the partly loaded region, these engines have exhaust gas temperatures of less than 200° C. To treat the exhaust gases from these engines, therefore, catalysts with as low as possible a light-off temperature and a high catalytic activity, even at temperatures below 200° C., are required. This is currently achieved by using very large amounts of noble metal. Palladium is preferably used since it is less costly than platinum and it also has a higher oxidation activity.

An object of the present invention is to provide a catalyst which has a very low light-off temperature and a high catalytic activity when using a small amount of noble metal.

SUMMARY OF THE INVENTION

The above object and other objects of the invention can be achieved by an oxidation catalyst which contains platinum on a finely divided support material. The catalyst is characterized in that it contains lead, as an additional promoter, with a molar ratio of lead to platinum of 0.5:1 to 3:1.

Lead is generally recognized as a catalyst poison. Thus, the finding that it is able to greatly increase the catalytic activity of platinum was all the more surprising. Catalytic activities were measured which would have been achieved, in the absence of lead, only by using six times the amount of noble metal.

The catalyst is preferably used, as is conventional when treating car exhaust gases, as a coating catalyst on an inert carrier structure. Suitable carrier structures are so-called honeycomb structures made of ceramic or metal with parallel flow channels for the exhaust gas. The catalyst is deposited onto the internal walls of these flow channels at concentrations of 50 to 600 g/l of carrier structure volume using known processes.

The catalyst may be prepared in a variety of ways. Thus, there is the possibility of first processing the finely divided support material to give an aqueous coating dispersion and then coating the carrier structure with this dispersion. After drying and calcining the coating, platinum and lead may be incorporated into the coating by impregnating the coated carrier structure with soluble precursors of these elements. The impregnation process may be performed with both elements simultaneously, using a common impregnating solution, or may take place in any sequence using two separate impregnating solutions one after the other. After impregnation, the catalyst structure is again dried and calcined.

BRIEF DESCRIPTION OF DRAWINGS

The present invention will be further understood with reference to the accompanying drawings, wherein.

DETAILED EMBODIMENTS OF INVENTION

Figure 1:
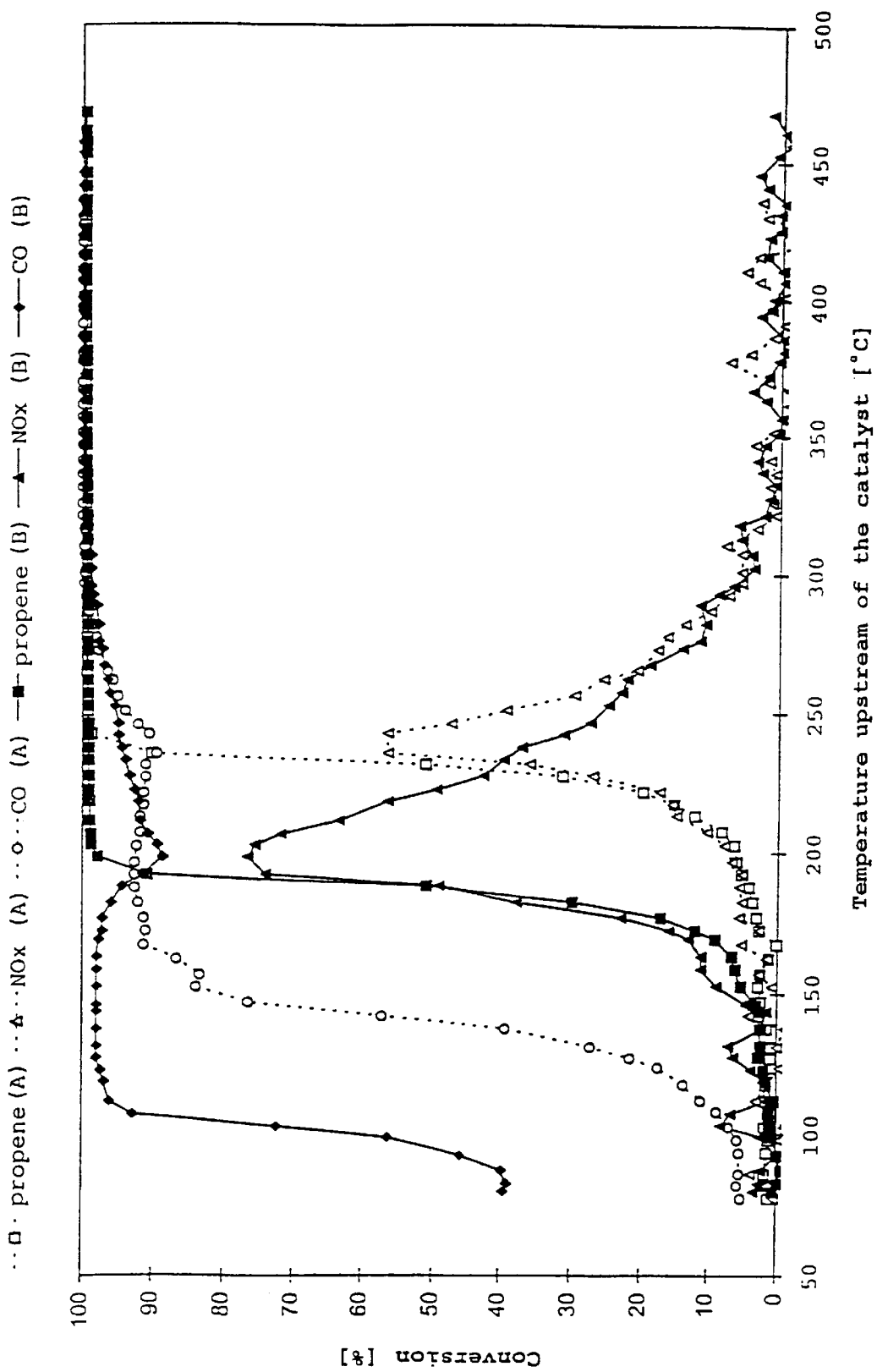
FIG. 1 represents conversion curves for propene, $NO_x$, and CO as a function of exhaust gas temperature for freshly prepared catalysts according to the invention.

According to the more detailed aspects of the invention, it is preferred that the support material is coated with the catalytic components before application to the carrier structure. For this purpose, the powdered material is agitated in a vessel and the impregnation solution is simultaneously sprayed onto it. In accordance with the principle of pore volume impregnation, the volume of the solution is adjusted to a value between 70 and 90% of the absorption capacity of the support material. After thermally fixing the catalytic components onto the support material (drying and calcining) the material is dispersed in water and the carrier structure is coated with this dispersion. Platinum and lead may be applied simultaneously to the support material. There is also the possibility, however, of initially depositing only platinum on the support material and introducing the lead only after coating the carrier structure, by impregnating the coating.

Precursors for platinum which may be used are known platinum compounds such as hexachloroplatinic acid, platinum nitrate, platinum(IV) chloride, tetraammineplatinum (II) nitrate, tetraammineplatinum(II) hydroxide and hexahydroxy-platinic(IV) acid complexed with ethanolamine or methanolamine. Lead acetate is preferably used for impregnating with lead.

The support materials suitable for purposes of this invention include, for example, active aluminum silicate. Many active transition metal oxides are known for this purpose as is readily understood by those skilled in the art. That is, the term "support" material has a well recognized meaning in this technology and it is that meaning that is intended herein.

COMPARISON EXAMPLE 1

A conventional oxidation catalyst (A), with 1.77 g/l of platinum on aluminum silicate, was prepared. The aluminum silicate was aluminum oxide which had been stabilized with 5 wt. % of silicon dioxide. The specific surface area of this material was 153 m$^2$/g.

The aluminum silicate was loaded with 1.5 wt. % of platinum, with respect to the total weight of activated aluminum silicate, by the pore volume impregnation process described above. Tetraammineplatinum(II) hydroxide was used as the precursor compound for platinum. After impregnation, the powdered material was dried and calcined at 300° C. Then it was processed to give an aqueous coating dispersion with a solids content of 35 wt. % and applied to a honeycomb carrier structure of cordierite with a cell density of 62 cm$^{-2}$. The coating was calcined in air for two hours at 300° C. and then reduced in a stream of forming gas (95 vol. % N$_2$; 5 vol. % H$_2$) for a period of two hours at 500° C.

The final catalyst contained 120 g/l of Pt/aluminum silicate and 1.77 g/l of platinum.

EXAMPLE 1

A second catalyst (B) was made up in the same way as in comparison example 1 and then impregnated with a lead acetate solution. After impregnation, the catalyst was dried for two hours at 100° C., calcined in air for two hours at 300° C. and finally reduced in forming gas for two hours at 500° C.

The final catalyst contained lead and platinum in the molar ratio 2:1.

EXAMPLE 2

A third catalyst (C) was made up in the same way as in example 1. The molar ratio of lead to platinum was adjusted to a value of 1:1.

APPLICATION EXAMPLE

The conversion of carbon monoxide, propene and nitrogen oxides was measured using the three catalysts in a model gas unit with the model gas composition given in Table 1. The gas temperature was increased at a rate of 15° C./min during the measurements.

TABLE 1

| Model gas composition | |
| --- | --- |
| Gas component | Concentration [vol. %] |
| Carbon monoxide | 0.035 |
| Propene | 0.240 |
| Nitrogen monoxide | 0.027 |
| Hydrogen | 0.012 |
| Carbon dioxide | 10.7 |
| Oxygen | 6 |
| Water vapor | 10 |
| Nitrogen | 72.986 |
| Sulfur dioxide | — |

Table 2 gives the light-off temperatures T$_{50\%}$ for carbon monoxide and propene, the temperatures for maximum nitrogen oxide conversion T$_{max}$ and the maximum nitrogen oxide conversion measured at this temperature.

TABLE 2

| | Experimental results | | | |
| --- | --- | --- | --- | --- |
| Catalyst | CO conversion T$_{50\%}$ [C] | Propene conversion T$_{50\%}$ [C] | NO$_x$ conversion T$_{max}$ [C] | Maximum NO$_x$ conversion [%] |
| A | 140 | 232 | 240 | 56 |
| B | 98 | 188 | 199 | 77 |
| C | 102 | 198 | 213 | 71 |

FIG. 1 shows the conversion of the components carbon monoxide, propene and nitrogen oxide between 50 and 500° C. for comparison catalyst A from comparison example 1 and for the catalyst B according to the invention, from example 1. It can clearly be seen that the catalyst according to the invention has a much lower light-off temperature than the comparison catalyst and that nitrogen oxides are converted much more effectively.

Figure 2:
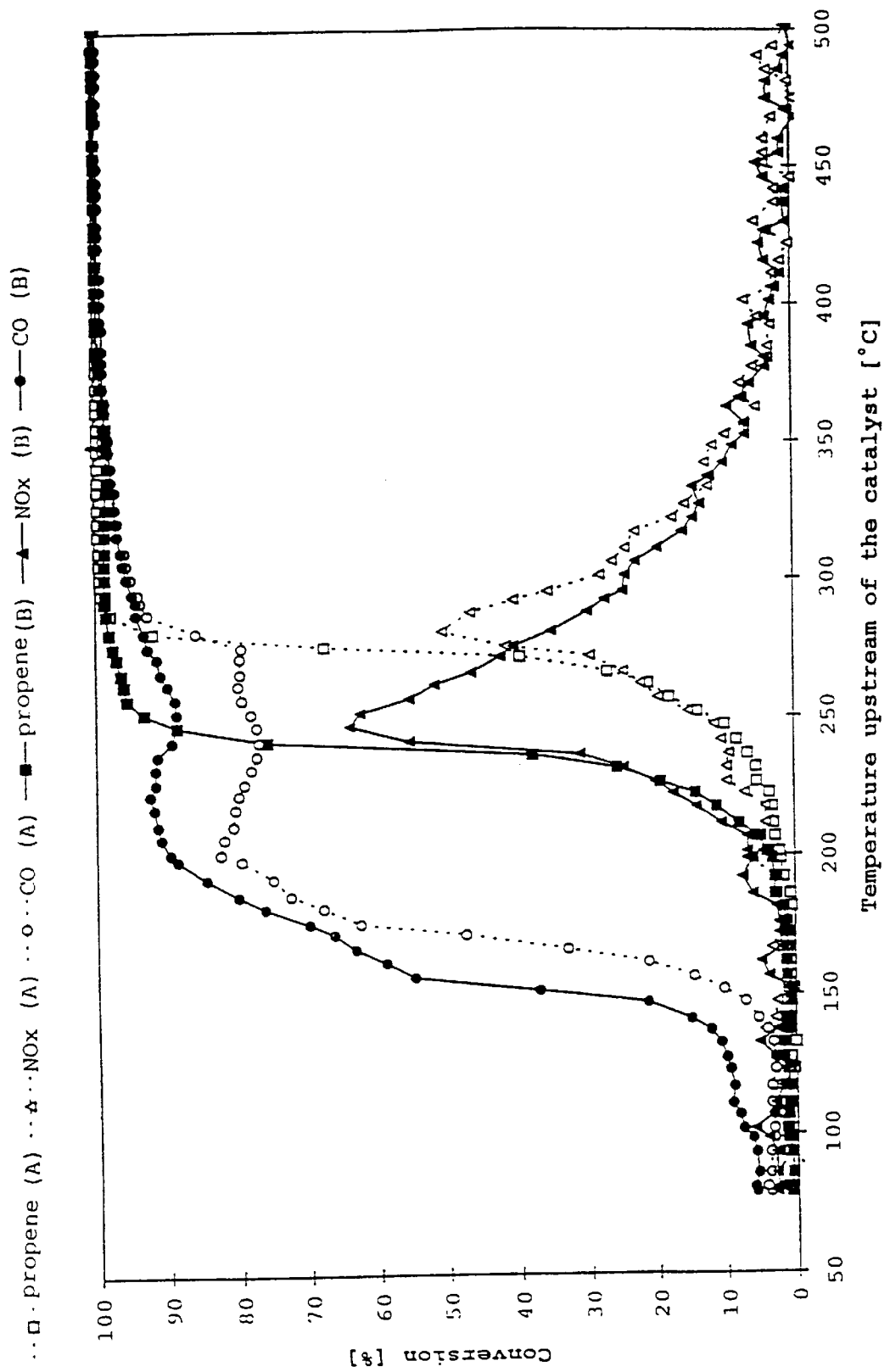
FIG. 2 represents conversion curves for propene, $NO_x$ and CO as a function of exhaust gas temperature for aged catalysts according to the invention.

Even after oven ageing the two catalysts for sixteen hours at 750° C. in an atmosphere containing 10 vol. % water vapor and 90 vol. % air, the activity of the catalyst containing lead is much better than that of the lead-free catalyst. The corresponding conversion curves are given in FIG. 2.

Further variations and modifications of the foregoing will be apparent to those skilled in the art and are intended to be encompassed by the claims appended hereto.

German priority application 197 56 144.6 is relied on and incorporated herein by reference.

We claim:

1. An oxidation catalyst comprising platinum deposited on a finely divided support material, and lead, as a promoter, wherein said finely divided support is an aluminum oxide stabilized with silicon dioxide, and wherein a molar ratio of platinum to lead is from 1:1.3 to 1:3.

2. The oxidation catalyst according to claim 1, wherein the stabilized aluminum oxide is stabilized with 5 wt. % silicon dioxide.

3. The oxidation catalyst according to claim 2, present as a coating catalyst on an inert carrier structure at a concentration of 50 to 600 g/l of carrier structure volume.

4. A honeycomb carrier coated with the catalyst of claim 1.

5. A method of making the catalyst according to claim 1 comprising forming an aqueous coating dispersion from a finely divided support material, coating an inert carrier with said dispersion, calcining said inert carrier having said dispersion coated thereon, impregnating said carrier with a precursor of platinum and a precursor of lead, and calcining the said carrier to obtain said catalyst.

6. The method according to claim 5 wherein the carrier is dried at least once before at least one of the calcining steps.

7. A method of purifying the exhaust gas stream of an automotive vehicle comprising contacting said stream with the catalyst of claim 1.

8. The oxidation catalyst according to claim 1, wherein the molar ratio of platinum to lead is 1:2.

* * * * *